(12) United States Patent
Graham et al.

(10) Patent No.: US 6,248,271 B1
(45) Date of Patent: Jun. 19, 2001

(54) METHOD OF MAKING AN INSERT FOR USE IN A MOLD FOR MOLDING ROOF COVERING PRODUCTS

(75) Inventors: William David Graham, Granville; Andy Rudy, Upper Arlington; Jean E. Schelhorn, Granville, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/465,358

(22) Filed: Dec. 16, 1999

(51) Int. Cl.$^7$ .................................................. B29C 39/26
(52) U.S. Cl. ............................ 264/39; 249/112; 264/225; 264/337; 264/338; 264/328.18
(58) Field of Search .............................. 264/39, 338, 337, 264/225, 328.18; 249/112

(56) References Cited

U.S. PATENT DOCUMENTS

| | | |
|---|---|---|
| 2,584,109 | 2/1952 | Blackburn et al. . |
| 2,714,226 * | 8/1955 | Axelrad ................................ 264/337 |
| 3,550,213 | 12/1970 | Ormsby et al. . |
| 3,632,278 | 1/1972 | Hall et al. . |
| 3,638,299 | 2/1972 | Garner et al. . |
| 3,723,584 | 3/1973 | Nussbaum . |
| 3,754,499 | 8/1973 | Helsman et al. . |
| 4,028,450 | 6/1977 | Gould . |
| 4,117,060 * | 9/1978 | Murray ................................ 264/338 |
| 4,225,109 | 9/1980 | Yotsutsuji et al. . |
| 4,240,780 | 12/1980 | Carcey . |
| 4,551,084 * | 11/1985 | Lake ................................. 425/185 |
| 4,604,141 | 8/1986 | Natori et al. . |
| 4,614,630 | 9/1986 | Plium, Jr. . |
| 4,656,722 * | 4/1987 | Armstrong ........................... 264/225 |
| 4,659,056 | 4/1987 | Michaud-Soret . |
| 4,824,628 | 4/1989 | Curfman . |
| 4,834,929 | 5/1989 | Dehoff et al. . |
| 4,976,400 | 12/1990 | Martell et al. . |
| 5,061,427 | 10/1991 | Hirzel . |
| 5,156,754 | 10/1992 | Nomura et al. . |
| 5,176,839 | 1/1993 | Kim . |
| 5,307,604 | 5/1994 | Tasso . |
| 5,545,366 | 8/1996 | Lust et al. . |
| 5,580,507 | 12/1996 | Williamson et al. . |
| 5,615,523 | 4/1997 | Wells et al. . |
| 5,630,305 * | 5/1997 | Hlasnicek ........................... 264/220 |
| 5,678,162 | 10/1997 | Barlow et al. . |
| 5,711,126 | 1/1998 | Wells . |
| 5,800,747 * | 9/1998 | Cavasin ............................ 264/338 |
| 5,800,752 * | 9/1998 | Charlebois ........................... 264/71 |

OTHER PUBLICATIONS

Ashley, Mechanical Engineering, Rapid Mold–Making for Investment . . . , (Nov. 1992).

Alloy Digest, Viscount 44, Data On World Wide Metals . . . , (Sep. 1960).

* cited by examiner

*Primary Examiner*—Allan R. Kuhns
(74) *Attorney, Agent, or Firm*—Inger H. Eckert; James J. Dottavio

(57) ABSTRACT

A method of molding roofing shingles includes the steps of providing a compression mold having two mold bodies, and installing a mold insert in each of the two mold bodies. The surfaces of the inserts are shaped to correspond with the desired shape of a roofing shingle. A multiplicity of roofing shingles are molded using the compression mold. Each molding step includes charging the mold with a moldable material containing resin in an amount within the range of from about 10 to about 40 percent, and filler material in an amount within the range of from about 60 to about 90 percent, wherein the filler material subjects the inserts to wear by abrasion. The inserts in the mold are replaced when they are worn out, but this is done without replacing the mold bodies.

20 Claims, 3 Drawing Sheets

METHOD OF MAKING AN INSERT FOR USE IN A MOLD FOR MOLDING ROOF COVERING PRODUCTS

TECHNICAL FIELD

This invention relates in general to molding processes for molding construction materials. More particularly, this invention pertains to molding a roof covering of the type suitable for providing an aesthetically pleasing appearance and a high degree of weatherability when applied to the roof of a building.

BACKGROUND OF THE INVENTION

Conventional roof coverings for sloped roofs include asphalt shingles, wooden shake shingles, sheet metal, slate, clay and concrete tile. Clay and slate are advantageous because of their high weatherability and desirable appearance. Various parts of the world have local or regional architectural preferences for the appearance of a roof. In Europe, clay tile and slate are generally preferred over the relatively flat looking asphalt shingle. Tastes in the U.S. vary, with the western and southwestern part of the U.S. preferring clay tile or wooden shakes and shake shingles.

One of the problems with clay tile and slate roofs is that the clay and slate tiles must be carefully fastened individually to the roof, and therefore they are expensive to install. Also, clay and slate tiles are inherently fragile, and suffer much breakage during manufacturing, shipping and installation. These materials are fragile even after installation on the roof, and can be damaged by foot traffic on the roof. One of the problems with wood shake shingles is that they are not naturally fire resistant, and therefore are prohibited in certain fire-prone areas, or at least require treatment for fire resistance.

Molded plastic shingles have been developed as an alternative both to clay and slate tiles, and to wooden shake tiles. U.S. Pat. No. 5,615,523 to Wells et al., which is herein incorporated by reference, discloses such shingles. Typical compositions include about 20 percent resinous material and about 80 percent fine stone filling and glass fiber reinforcement, with minor amounts of additives. This class of materials is also known as polymer concrete or highly filled resin. The high percentage of filler is important for maintaining a high fire resistance. Typically, these highly filled plastic shingles are compression molded, although casting, injection molding, injection compression molding, and transfer molding can also be used.

In general, the wear surfaces of compression molds are relatively durable where the moldable material is a typical fiber reinforced plastic (FRP) material. However, when the moldable material is highly filled with an inherently abrasive filler material, as is the case with the highly filled plastic material used to mold roofing shingles and tiles, the mold surfaces can wear out at a relatively rapid rate. Erosion of the mold cavity surface necessitates removal of the mold for refurbishing. This is a time consuming and expensive process.

It would be advantageous if there could be developed a molding process that uses relatively inexpensive facings or inserts so that when the molding surface wears out the surface can be replaced by a fresh insert without replacing the whole mold. Further, such a molding process would improve upon the conventional milling and machining methods used in imparting the desired surface features into the surface of mold. Also, it would be beneficial if a method for producing the mold inserts could be developed. Such a method would eliminate the need for an expensive milling process to prepare the molding surface in the inserts.

SUMMARY OF THE INVENTION

The above objects as well as other objects not specifically enumerated are achieved by a method of molding roofing shingles, comprising the steps of providing a compression mold having two mold bodies, and installing a mold insert in each of the two mold bodies. The surfaces of the inserts are shaped to correspond with the desired shape of a roofing shingle. A multiplicity of roofing shingles are molded using the compression mold. Each molding step includes charging the mold with a moldable material containing resin in an amount within the range of from about 10 to about 40 percent, and filler material in an amount within the range of from about 60 to about 90 percent, wherein the filler material subjects the inserts to wear by abrasion. The inserts in the mold are replaced when they are worn out, but this is done without replacing the mold bodies.

In another embodiment of the invention, there is provided a method of molding roofing shingles comprising the steps of providing a compression mold having two mold bodies, and installing a mold insert in each of the two mold bodies, with the surfaces of the inserts being shaped to correspond with the desired shape of a roofing shingle. A multiplicity of roofing shingles are molded using the compression mold, wherein each molding step includes charging the mold with a moldable material containing moldable resin in an amount within the range of from about 10 to about 40 percent, and filler material in an amount within the range of from about 60 to about 90 percent. The filler material subjects the inserts to wear by abrasion, and the inserts in the mold are replaced when they become worn. The mold inserts are produced by casting them from metal according to steps including providing a pattern element of pattern material corresponding to the roofing shingle, coating the pattern element with a first layer of ceramic coating, and drying the first layer of ceramic coating. Subsequent layers of ceramic coating are added, and each layer is dried before another subsequent layer is added, to form a ceramic coated pattern element. The pattern material is removed from the ceramic coated pattern element to form a mold of ceramic material having a mold cavity corresponding to the roofing shingle. The mold of ceramic material is heated to a temperature suitable for molding an insert. Molten metal is introduced into the ceramic mold cavity. Finally the ceramic mold and the metal are cooled, and the ceramic material is removed to form a metallic mold insert having a surface corresponding to that of the roofing shingle.

Various objects and advantages of this invention will become apparent to those skilled in the art from the following detailed description of the preferred embodiment, when read in light of the accompanying drawings.

DETAILED DESCRIPTION AND PREFERRED EMBODIMENTS OF THE INVENTION

The invention will be described with reference to roof coverings, such as roofing shingles, which are similar in appearance to wood shake shingles. It is to be understood, however, that the terms "shingles" and "roofing shingles" also include shingles, tiles and panels. Also, the shingles, tiles and panels can have appearances other than wood shake shingles, such as, for example, slate panels or tiles, and mission tiles.

Figure 1:
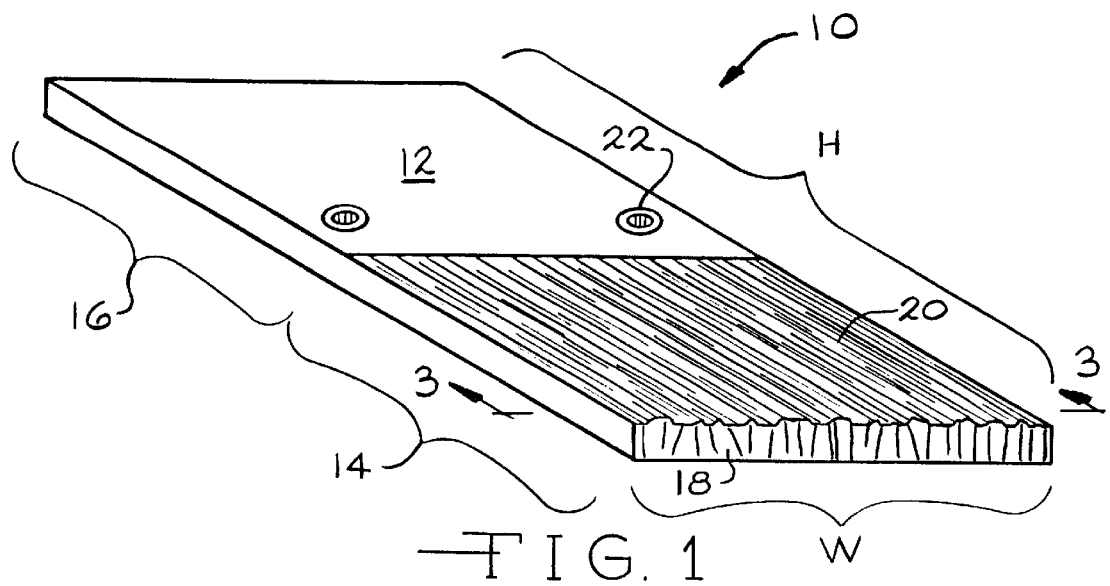
FIG. 1 is a schematic perspective view of a molded roofing shingle molded according to the method of the invention.
Figure 2:
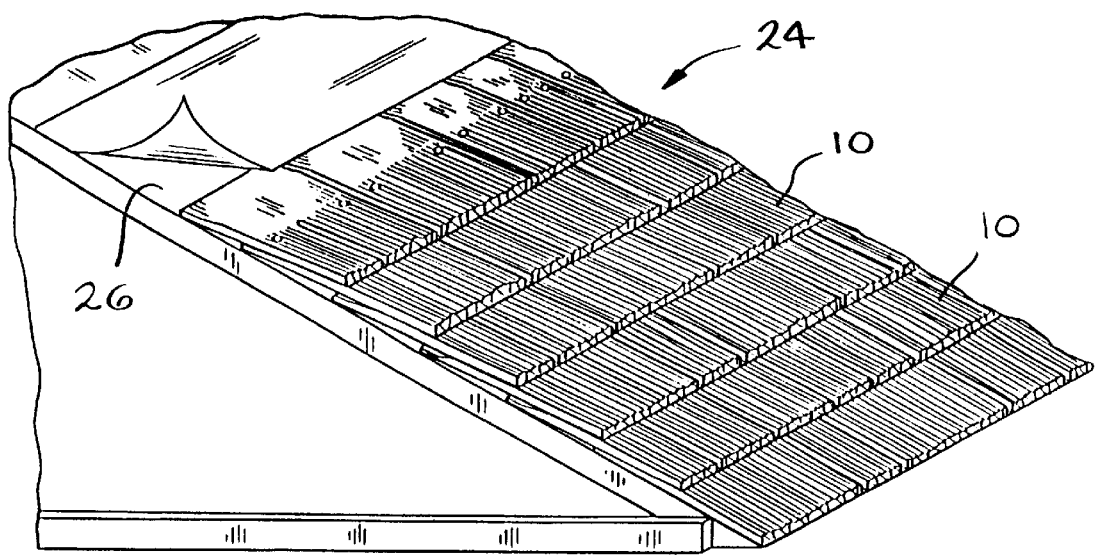
FIG. 2 is a schematic perspective view of a partially completed roof of molded roofing shingles similar to that shown in FIG. 1.

As shown in FIGS. 1 and 2, the shingle 10 has a top surface 12 comprised of a lower or exposed portion 14 and an upper or headlap portion 16. At its lower end, the shingle has a butt end 18. As shown, the exposed portion 14 of the shingle has a multiplicity of grooves 20 running in a direction which is intended to be up the slope of the roof (i.e., along the height of the shingle) when the shingle is installed on the roof to give the appearance of a wooden shake shingle. The butt end of the shingle preferably has a plurality of oblique surfaces at differing angles to the butt end to provide the viewer with something other than a simple, straight butt end of the shingle. This will greatly enhance the aesthetic appearance of the shingle. The underside of the shingle 10 is provided with a plurality of ribs, not shown in FIGS. 1 or 2, for structural strength and dimensional stability of the shingle. The top surface 12 of the shingle contains optional nailing targets 22 to indicate to the roofer the best location for the nails to be applied to the shingle. The roof 24 contains a plurality of shingles 10 placed on a roof deck 26.

As explained in U.S. Pat. No. 5,615,523 to Wells et al., which is hereby incorporated by reference in its entirety, the shingle composition preferably comprises about 20 percent resinous material by weight and about 80 percent filler material. The filler material can be of any suitable fineness, but preferably has a fineness of about 200 mesh. As used herein, the terms "resin" and "resinous material" mean any organic substance which can act as a matrix for the inorganic filler material. The resin or resinous material can be either a thermoplastic or thermoset, but is preferably a thermoset material. Examples of materials which are resinous and suitable for use with the invention are polyester, polyethylene terephthalate (PET), polycarbonate and polypropylene resins. In general, the resins preferred are plastic resins, containing no asphalts, or only small amounts of asphalt, such as less than about 5 percent. Thermoset polyester resins are the most preferred, although a small amount of PET can be added to the input stock in the resin process so that the polyester resin is derived from input stock containing PET. This provides more flexibility to the shingle. Resins suitable for use with the are available from AOC, Memphis, Tenn. The resinous material can include small amounts of other materials such as mold release agents.

Numerous filler materials can be used with the invention. Examples include clay, aluminum trihydrate, glass fibers of various lengths, other fibrous reinforcements (organic or inorganic), and finely divided slate, shale, limestone, fly ash, bottom ash and talc. The filler material is finely ground. The particles must be small enough to blend into the resin matrix, especially when molded into narrow parts, such as the ridges and the ribs. The filler particles cannot be too small or else the surface area will be so great as to excessively bind up all the resin, thereby requiring increased amounts of the resin, which is a much more expensive component of the composition than is the filler material. Preferred fillers include slate dust which imparts a black color, green shale, red clay and white clay. These fillers can be combined to provide commonly used wood shake shingle colors such as light brown, gray and dark brown. By selecting the appropriate color for the filler material, the desired color of the molded shingle can be produced without the use of pigments. This is an important feature of the molded shingle because experience has shown that molded roof tiles and shingles using pigments tend to bleach out or wear off and change color after the shingle has been subjected to weathering on a roof. It is preferred that any slate present have a fineness such that substantially all the material is capable of passing through an 18 mesh screen, and that any shale present also have a fineness such that substantially all the material is capable of passing through an 18 mesh screen. One aspect of the filler material is that it is very abrasive, often having a hardness of within the range of from about 5 to about 7 on the Mho scale. For example, ground slate has a hardness of 6 to 7 and ground shale has a hardness of 5 to 6. The abrasiveness of the filler material can have a deleterious effect on the molding surfaces, causing them to wear out prematurely, as will be discussed below.

Preferably, the composition includes no more than about five percent, and more preferably about three percent by weight, chopped glass fibers, available from Owens-Corning, Toledo, Ohio.

Figure 3:
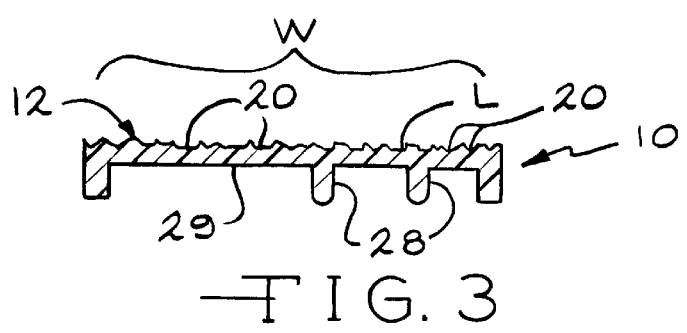
FIG. 3 is a cross-sectional view in elevation of the roofing shingle of FIG. 1, taken along line 3—3.

As shown in FIG. 3, when a cross section of the shingle 10 is taken at a location along the height H of the shingle, as indicated by the section line 3—3 in FIG. 1, the plurality of grooves 20 can be seen in the top surface 12. The shingle 10 is illustrated with two ribs 28, on the bottom surface 29 of the shingle, although an actual shingle would typically have numerous ribs. The width of the shingle W is indicated as spanning from side to side of the shingle. The top surface 12 of the shingle has a linear distance, from side to side of the shingle, that is significantly longer than width W because of the convolutions of the grooves 20. If one were to stretch out the top surface 20 into a flat surface, the surface length L of the flat surface would be greater than the width W of the shingle. Typically, where the shingle has surface features similar to wood shake shingles, there is at least one place along the height H of the shingle where the ratio of the surface length L of the linear surface across the shingle to the width W across the width of the shingle is at least about 1.2:1, and preferably within the range of from about 1.3:1 to about 3.0:1. As can be appreciated, where the shingle is a molded shingle, the mold for the shingle must have molding surfaces corresponding to the top surface of the shingle, and such molding surfaces would necessarily have at least one place along the height of the molding surface, corresponding to the top of the roofing shingle, where the ratio of the length of the linear surface across the molding surface to the width, across the width of the molding surface is at least about 1.2:1 and preferably within the range of from about 1.3:1 to about 3.0:1.

Another characteristic of highly dimensioned shingles (such as wood shake shingles and natural slate tiles) beyond that of the extra width distance created by surface variations and convolutions of the shingle, is that as one views the shingle across the width of the shingle, there are numerous abrupt level changes. In a shake shingle, the grooves 20 form numerous abrupt changes in the level of the top surface 12. Similarly, in slate tile shingles the chipping or flaking of the various surface portions create abrupt changes across the width of the shingle. Typically, there is at least one place along the height H of the shingle where the level of the top surface of the roofing shingle changes abruptly at least 10 times across the width of the shingle. As can be appreciated, where the shingle is a molded shingle, the mold for the shingle must have molding surfaces corresponding to the top surface of the shingle, and such molding surfaces would necessarily have at least one place along the height of the molding surface corresponding to the top of the roofing shingle where the level of the molding surface corresponding to the top surface of the roofing shingle changes abruptly at least 10 times across the width of the shingle.

Figure 4:
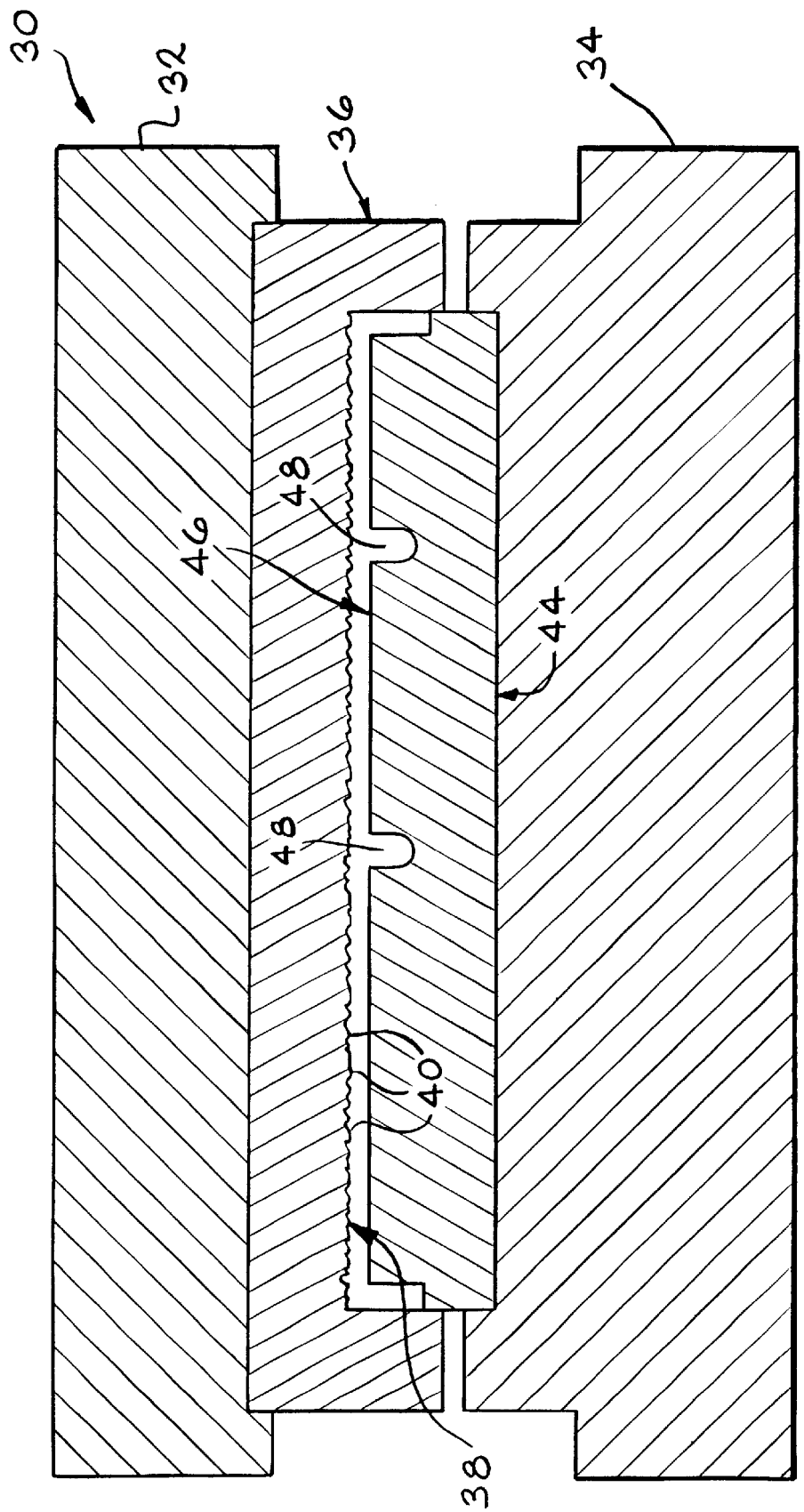
FIG. 4 is a schematic cross-sectional view in elevation of a mold, including top and bottom inserts, for forming roofing shingles according to the invention.

As shown in FIG. 4, the mold 30 includes upper mold body 32 and lower mold body 34. Although the mold 30 shown and described here is a compression mold, it is to be understood that the method of the invention could also be carried out using an injection mold or an injection/compression mold, neither of which is shown. The upper and lower mold bodies 32, 34 are mounted so that either or both are mounted for vertical movement to allow removal of a molded shingle and recharging the mold with a new batch of moldable material. A suitable framework, not shown, is provided for this purpose, was would be appreciated by those skilled in the art. Likewise, numerous mold heating, cooling lubricating and monitoring devices are employed in the mold, as would also be within the general comprehension of those skilled in the art.

The upper mold body 32 is provided with a top mold insert 36 that has a top molding surface 38 that corresponds to the top surface 12 of the shingle. Therefore, where the shingle to be molded is to be similar to a wood shake shingle, the top molding surface 38 has small ridges 40 that correspond to or complement the grooves 20 in the shingle 10. The top insert 36 can be fixed to the upper mold body 32 by any suitable means, such as by clamping or by bolting.

The lower mold body 34 is provided with a bottom mold insert 44 that has a bottom molding surface 46 that corresponds to the bottom surface 29 of the shingle. The bottom molding surface 46 illustrates two cutouts 48 that correspond to or complement ribs 28 in the shingle 10. The bottom insert 44 can be fixed to the lower mold body 34 by any suitable means, such as by clamping or by bolting. The upper and lower inserts 36 and 44 can be made using traditional milling techniques or by any other method. A preferred method of making the inserts is by casting them using a ceramic mold, in a process disclosed below. One skilled in the art appreciates that the top and bottom inserts may be used independently. For example, the top body 32 could be inserted, and used with a fixed (non-inserted) lower body, since the majority of the detail and the visible surface is formed by the top body 32. Alternatively, one lower insert 44 could be used to form the backside detail, including for example, the ribs 28, for different types of shingles. An example of two shingles which could use an interchangeable lower insert include slate and shake tiles having similar height and width.

The molding process includes mixing the resin and the filler by any suitable means, such as a bulk molding compound mixer. During molding, the upper and lower mold bodies, including the attached inserts, are separated from each other for the removal of the previously molded shingle, and a charge of new moldable material is placed between the top and bottom mold inserts. The mold is closed, and the charge is molded into another roofing shingle 10. The mold is preferably operated at a temperature within the range of from about 300° F. to about 350° F., and at a pressure within a pressure range of from about 600 psi to about 800 psi. If glass fibers are used, they should be added after nearly all the mixing is completed.

Where the moldable material contains a highly abrasive filler, the mold inserts wear out relatively rapidly. For example, whereas a molding process using a typical polyester moldable material reinforced with glass fibers would be expected to last at least 500,000 molding cycles before wearing out the molding surfaces, it has been found that when a polyester resin is highly filled with an abrasive filler material, such as ground slate, the molding surface wears out after as few as 50,000 to 80,000 cycles. This, of course, greatly reduces the overall efficiency of the molding operation when the mold must be replaced to refurbish the molding surface. The wearing out of the molding surface is particularly troublesome at the shear edges of the mold. By using inserts that are readily replaceable, such as the top and bottom mold inserts 36 and 44, the molding operation is interrupted for only a short time while the worn out inserts are replaced. The primary mold apparatus of the mold 10, including the upper mold body 32 and the lower mold body 34, need not be disassembled or removed during the replacement of the inserts. The term "wear" and "wearing out" refer to the deterioration or loss of detail of the molding surfaces 38 and 46, including the shear edges, to the extent the singles produced using the inserts are no longer commercially acceptable.

A preferred method of making metallic inserts will now be described, with reference to FIGS. 5–8. First a pattern element 50 of pattern material is provided. The pattern material must be a material that can be easily formed or shaped, and is preferably a meltable material, such as a wax or a resinous material. The pattern element 50 has a pattern surface 52 that complements or inversely corresponds to the exact shape and surface characteristics of one of the surfaces of the roofing shingle 10. For example, the pattern surface 52 of the pattern element 50 shown in FIG. 5 inversely mimics the shape of the bottom mold insert 44 at least to the extent that the pattern surface 52 complements or corresponds inversely to the bottom molding surface 46. This assures that the final bottom molding surface 46 of the bottom insert 44 will create the proper shingle bottom surface 29 on the molded shingle.

Figure 6:
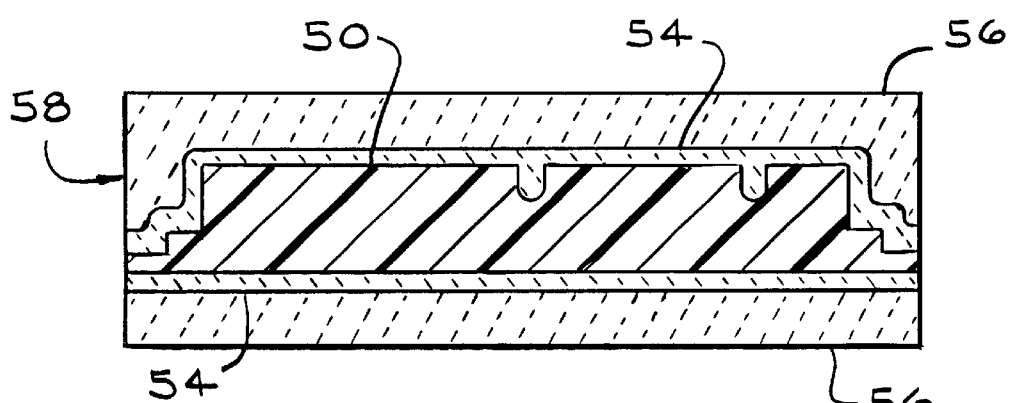
FIG. 6 is a view similar to that of FIG. 5, showing ceramic coatings on the pattern element.

The pattern element 50 then is subjected to an investment process. The pattern element is initially coated with a ceramic slurry to form a first layer 54 of ceramic coating, as shown in FIG. 6. The ceramic material may be any suitable ceramic material which would, under compressive stress, withstand the rigors of a molding process. Suitable ceramic materials include silicon nitride and silicon carbide, the former being preferred. After the first layer 54 of ceramic coating is applied, it is dried under conditions of low humidity. Preferably, the various layers of ceramic material are dried under conditions of humidity lower than about 30 percent.

Subsequently, additional layers of ceramic coating are added, with each layer being dried before the addition of the next layer. These subsequent layers are collectively indicated at 56 in FIGS. 6 and 7. The process of multiple coating steps forms a ceramic coated pattern element 58. In order to provide the best conformance to the desired surface shape of the bottom molding surface 46, the first layer 54 of ceramic coating is preferably in a more fluid state, is thinner and less viscous than the subsequent layers 56. Also, to provide good adherence from layer to layer, the layers are coated with zirconia sand, preferably while each layer of ceramic coating is still wet.

Figure 5:
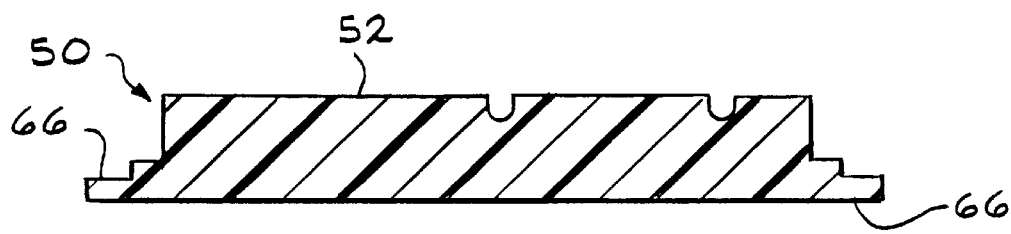
FIG. 5 is a schematic cross-sectional view in elevation of a pattern element for making an insert used in molding shingles according to the invention, where the pattern element corresponds to the bottom surface of the molded roofing shingle of FIG. 1.
Figure 7:
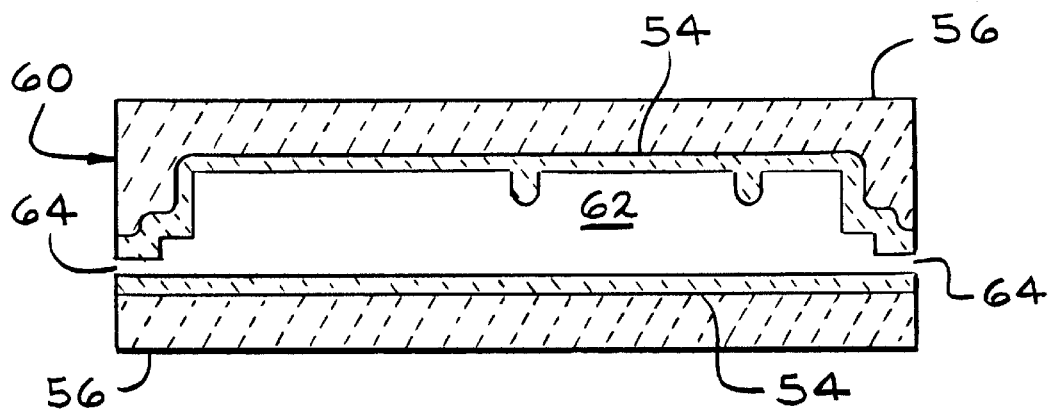
FIG. 7 is a view similar to that of FIG. 6, showing the ceramic mold formed by the removal of the material of the pattern element.
Figure 8:
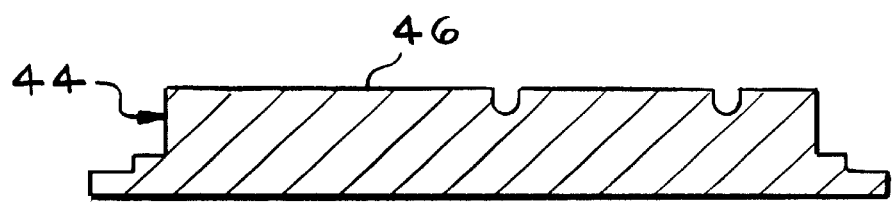
FIG. 8 is a view similar to that of FIG. 7 showing the mold insert having a surface corresponding to the roofing shingle.

The pattern material from the pattern element 50 is then removed from the ceramic coated pattern element 58, thereby forming an insert mold 60 of ceramic material 54, 56 having a mold cavity 62 corresponding to the shape of the roofing shingle 10. Preferably, the pattern material is removed from the ceramic coated pattern element 58 by heating and melting the pattern material. For this purpose, conduits 64 or other suitable structures are formed to provide flow conduits into the insert mold cavity 62, as shown in FIG. 7. The conduits 64 are formed by gating 66, such as sprues, gates and risers, as shown in FIG. 5.

Once the insert mold 60 is formed, a metallic insert 44 can be cast using the mold 60. The casting process involves heating the ceramic insert mold 60, introducing molten metal into the insert mold cavity 62, cooling the ceramic mold and the metal, and removing the ceramic material 54, 56 to form a metallic mold insert 44 having a surface 46 corresponding to the roofing shingle 10. Preferably, the ceramic material of the insert mold 60 has a coefficient of thermal expansion similar to the expansion coefficient of the metal being cast. A preferred metal would be H 13 steel that is hardened after it is cast.

One of the advantages of the invention is that the cast tooling process enables the use of numerous metals that would not be suitable for machining, but can be cast into the desired shape and then used for great advantage in the shingle molding process.

While the casting of a generally rectangular shingle 10 has been described above and illustrated in the drawings, it is to be understood that the term "shingle" includes various accessories, such as edge pieces and hip and ridge pieces that would normally be associated with such roofing shingles.

The principle and mode of operation of this invention have been described in its preferred embodiments. However, it should be noted that this invention may be practiced otherwise than as specifically illustrated and described without departing from its scope.

What is claimed is:

1. A method of molding roofing shingles, comprising the steps of:
   providing a mold having two mold bodies;
   installing a respective mold insert into each of the two mold bodies, the mold inserts each having a surface shaped to correspond with a respective desired shape of a roofing shingle;
   molding a multiplicity of roofing shingles using the mold, wherein the step of molding each of the multiplicity of roofing shingles includes charging the mold with a moldable material containing resin in an amount within the range of from about 10 to about 40 percent, and filler material in an amount within the range of from about 60 to about 90 percent, and wherein the filler material subjects the inserts to wear by abrasion; and
   replacing the inserts in the mold upon wearing of the inserts, without replacing the mold bodies.

2. The method of claim 1 in which the filler material is primarily ground stone having a fineness of about 200 mesh.

3. The method of claim 1 in which the filler material is primarily ground stone having a hardness of within the range of from about 5 to about 7 on the Mho scale.

4. The method of claim 1 in which the filler material is primarily ground slate.

5. The method of claim 1 wherein the filler material subjects the inserts to wear by abrasion to the extent that the inserts wear out before reaching about 100,000 mold cycles.

6. The method of claim 1 in which the inserts are readily replaceable.

7. The method of claim 1 in which the roofing shingles include a plurality of structural ribs on a bottom side and a plurality of grooves on a top side.

8. The method of claim 1 in which there is a ratio of a length of a linear surface measured across the insert to a width measured directly across the insert, the length and width substantially corresponding to a top surface of the roofing shingle, the ratio having a value of at least about 1.2:1.

9. The method of claim 1 in which there is a ratio of a length of a linear surface measured across the insert to a width measured across the insert, the length and width substantially corresponding to a top surface of the roofing shingle, the ratio having a value within a range of from about 1.3:1 to about 3.0:1.

10. The method of claim 1 in which a level of the insert corresponding to a top surface of the roofing shingle changes abruptly at least 10 times across the width of the insert.

11. The method of claim 1 including a step of producing the mold inserts by casting them from metal.

12. The method of claim 11 in which the inserts are cast using a mold of ceramic material.

13. The method of claim 12 in which the ceramic material has a coefficient of thermal expansion similar to the expansion coefficient of the metal.

14. The method of claim 12 in which the ceramic material is formed in layers that are dried under conditions of humidity lower than about 30 percent.

15. A method of molding roofing shingles, comprising the steps of:
   providing a compression mold having two mold bodies;
   installing a respective mold insert in each of the two mold bodies, the mold inserts each having a surface shaped to correspond with a respective desired shape of a roofing shingle;
   molding a multiplicity of roofing shingles using the compression mold, wherein the step of molding each of the multiplicity of roofing shingles includes charging the mold with a moldable material containing moldable resin in an amount within the range of from about 10 to about 40 percent, and filler material in an amount within the range of from about 60 to about 90 percent, and wherein the filler material subjects the inserts to wear by abrasion; and
   replacing the inserts in the mold upon wearing of the inserts; wherein the mold inserts are produced by casting them from metal according to the steps of:
   (a) providing a pattern element of pattern material corresponding to the roofing shingle;
   (b) coating the pattern element with a first layer of ceramic coating;
   (c) drying the first layer of ceramic coating;
   (d) adding subsequent layers of ceramic coating, and drying each layer before a subsequent layer is added, to form a ceramic coated pattern element;
   (e) removing the pattern material from the ceramic coated pattern element to form a mold of ceramic material having a mold cavity corresponding to the roofing shingle;

(f) heating the mold of ceramic material to a temperature suitable for molding an insert;

(g) introducing molten metal into the ceramic mold cavity; and (h) cooling the ceramic mold and the metal, and removing the ceramic material to form a metallic mold insert having a surface corresponding to the roofing shingle.

16. The method of claim 15 in which the pattern material is a resinous material, and in which the step of removing the pattern material from the ceramic coated pattern element is accomplished by heating and melting the pattern material.

17. The method of claim 15 in which the first layer of ceramic coating is applied in a more fluid state than subsequent layers of ceramic coating.

18. The method of claim 15 in which zirconia sand is applied to the layers of ceramic coating to facilitate adherence of subsequent layers of ceramic coating.

19. The method of claim 15 in which the ceramic material has a coefficient of thermal expansion similar to the expansion coefficient of the metal.

20. The method of claim 15 in which the layers of ceramic material are dried under conditions of humidity lower than about 30 percent.

* * * * *